United States Patent [19]

Chang et al.

[11] Patent Number: 4,652,605

[45] Date of Patent: Mar. 24, 1987

[54] PREPARATION OF LOW MOLECULAR WEIGHT POLYMERS BY VINYL ADDITION POLYMERIZATION UNDER DILUTE REACTION CONDITIONS USING A POLYMERIC DILUENT

[75] Inventors: Wen-Hsuan Chang; Michael M. Chau; J. Alden Erikson, all of Gibsonia; Robert J. Lipinski, Pittsburgh; David T. McKeough, Gibsonia; Richard M. Nugent, Jr., Allison Park, all of Pa.

[73] Assignee: PPG Industries, Inc., Pittsburgh, Pa.

[21] Appl. No.: 682,446

[22] Filed: Dec. 17, 1984

[51] Int. Cl.⁴ .................... C08F 20/14; C08F 20/12
[52] U.S. Cl. ........................... 525/10; 525/11; 525/170; 525/518; 525/275; 525/301; 525/303; 528/361; 528/365; 528/354; 528/392; 528/271; 524/765; 524/769; 524/761; 524/762; 526/320; 252/188.31
[58] Field of Search ............... 525/10, 11, 170, 518, 525/275, 303, 301; 528/361, 365, 354, 392, 271; 524/765, 769, 761, 762; 526/317, 320; 252/188.31

[56] References Cited

U.S. PATENT DOCUMENTS

| 4,075,242 | 2/1978 | Rhum et al. | 560/190 |
|---|---|---|---|
| 4,082,816 | 4/1978 | Fisk et al. | 260/855 |
| 4,276,212 | 6/1981 | Khanna et al. | 260/39 R |
| 4,351,928 | 9/1982 | Smith | 525/443 |
| 4,361,676 | 11/1982 | Simpson | 525/118 |
| 4,377,661 | 3/1983 | Wright et al. | 524/522 |
| 4,414,370 | 11/1983 | Hamielec et al. | 526/88 |
| 4,415,681 | 11/1983 | Horvach | 523/334 |

FOREIGN PATENT DOCUMENTS

| 027719 | 4/1981 | European Pat. Off. . |
| 052233 | 5/1982 | European Pat. Off. . |
| 2703311 | 8/1978 | Fed. Rep. of Germany . |
| 8202387 | 7/1982 | PCT Int'l Appl. . |
| 967051 | 8/1964 | United Kingdom . |
| 1029544 | 5/1966 | United Kingdom . |
| 1095288 | 12/1967 | United Kingdom . |
| 1107249 | 3/1968 | United Kingdom . |
| 1156012 | 6/1969 | United Kingdom . |
| 1257638 | 12/1971 | United Kingdom . |
| 1515868 | 6/1978 | United Kingdom . |
| 2101121A | 1/1983 | United Kingdom . |

OTHER PUBLICATIONS

W. W. Aldinger, Epsilon-Caprolactone-Modified Hydroxyfunctional Acrylate Copolymers as Reactive Coating Components, 17th Fatipec Congress, Preliminary Program, Lugano, Switzerland, Sep. 23-28, 1984, pp. 69-83.
Barrett, "Dispersion Polymerization in Organic Media," pp. 284-285, copyright 1975, by John Wiley and Sons, New York.
Rhum & Aluotto, "Acrylic Copolymer Oligomers for High Solids Coatings Resins," Journal of Coatings Technology, vol. 55, No. 703, 8-83, published by the Federation of Societies for Coatings Technology, 1315 Walnut St., Philadelphia, Pa. 19107.
O'Driscoll, "Compositional Heterogeneity in Low Molecular Weight Copolymers as Revealed by Monte Carlo Simulations," Journal of Coatings Technology, vol. 55, No. 705, Oct. 1, 1983, published by the Federation of Societies for Coatings Technology, 1315 Walnut St., Philadelphia, Pa. 19107.
Spinelli, "The Role of Functionality in Low Molecular Weight High Solids Acrylic Resins," Organic Coatings and Applied Polymer Science Proceedings, vol. 47, 184th Meeting of the Division of Organic Coatings & Plastics Chemistry, 9-12-82, by the American Chemical Society, Washington, DC.

Primary Examiner—John Kight
Assistant Examiner—M. L. Moore
Attorney, Agent, or Firm—Linda Pingitore

[57] ABSTRACT

A polymeric reaction product, a process for its preparation and a coating composition containing the reaction product as a binder are described. The polymeric reaction product is prepared by the vinyl addition polymerization of a vinyl monomer component of which at least 50 percent by weight is an active hydrogen-containing vinyl monomer in the presence of a polymeric diluent. The rate of polymerization is controlled such that the amount of unreacted vinyl monomer, on the average, does not exceed 10 percent by weight of the total weight of the reaction mixture.

8 Claims, No Drawings

PREPARATION OF LOW MOLECULAR WEIGHT POLYMERS BY VINYL ADDITION POLYMERIZATION UNDER DILUTE REACTION CONDITIONS USING A POLYMERIC DILUENT

BACKGROUND OF THE INVENTION

The present invention relates to low molecular weight polymers.

In recent years there has been much research effort devoted to the preparation of low molecular weight polymers which can be utilized to prepare high solids coating compositions with a low volatile organic content. The thought has been, largely, that the lower the molecular weight of the polymer, the easier it would be to make low volatile organic content compositions. However, film properties such as hardness and durability often decrease as the molecular weight of the polymeric film-former decreases. This has been attributed to the average functionality of the polymer (number average molecular weight divided by equivalent weight) and the fact that polymers with lower levels of functionality tend to give softer films. One explanation which has been advanced concerns the level of non-functional polymer present. It has been generally thought that at least two functional groups must be present on each polymer backbone in order for the polymer to crosslink into the film. Therefore, low molecular weight polymers with less than two functional groups cannot contribute to the crosslinking network and thus tend to give poor film properties. There is a need, therefore, for a way to prepare polymers which have not only low molecular weight but which also have sufficient functionality in order to achieve good film properties.

SUMMARY OF THE INVENTION

In accordance with the present invention there is provided a polymeric reaction product which is prepared by a process which comprises the vinyl addition polymerization of a vinyl monomer component of which at least 50 percent by weight is an active hydrogen-containing vinyl monomer, in the presence of a polymeric diluent, the rate of polymerization being controlled such that the amount of unreacted vinyl monomer, on the average, does not exceed 10 percent by weight of the total weight of the reaction mixture. The present invention also provides for the process for preparing the polymeric reaction products and to the use of the reaction products in coating compositions.

DETAILED DESCRIPTION OF THE INVENTION

The polymeric reaction product of the present invention is prepared by a process which comprises the vinyl addition polymerization of a vinyl monomer component of which at least 50 percent by weight is an active hydrogen-containing vinyl monomer, the percentage based on the total weight of vinyl monomer component. Preferably the amount of active hydrogen-containing monomer ranges from 80 percent by weight to 100 percent by weight. Exemplary of suitable active hydrogen-containing vinyl monomers include 2-hydroxyethyl acrylate, 2-hydroxyethyl methacrylate, 2-hydroxypropyl acrylate, 2-hydroxypropyl methacrylate, 2-hydroxybutyl methacrylate, 1,4-butanediol acrylate or methacrylate, hydroxyethyl fumarate, butyl hydroxyethyl maleate, and hydroxyethyl oxyethyl methacrylate. Preferably, 2-hydroxypropyl methacrylate or 2-hydroxyethyl methacrylate are utilized. The balance of the vinyl monomer component can include a variety of other monomers which contain polymerizable vinyl unsaturation. For example, alkyl acrylates and methacrylates which contain from 1 to 18 carbon atoms, preferably 4 to 10 carbon atoms in the alkyl portion, such as methyl(meth)acrylate, ethyl (meth)acrylate, propyl(meth)acrylate and butyl(meth)acrylate, 2-ethylhexyl methacrylate, stearyl methacrylate, and isobornyl methacrylate. Also useful are styrene, and vinyl toluene. Mixtures of the aforesaid monomers can also be utilized if desired. A portion of the vinyl monomer component can also include a divinyl monomer or mixture of divinyl monomers such as 1,6-hexanediol diacrylate or ethylene glycol dimethacrylate. However, in order to achieve low molecular weight polymeric reaction products, it is preferred that only minimal amounts of divinyl monomer be utilized.

The vinyl addition polymerization of the claimed invention is conducted in the presence of a polymeric diluent. The polymeric diluent is one which is essentially inert to both the reactants and the product and which serves as the polymerization medium. By essentially inert is meant that the diluent does not participate in the vinyl addition polymerization to an appreciable extent and, therefore, is not incorporated into the polymer which is formed to any substantial degree. The diluent can contain active hydrogen functionality and preferably does, although diluents which do not contain active hydrogen functionality are also suitable herein. The diluent should be selected such that at the particular reaction temperature employed the monomers and the polymeric reaction product formed are sufficiently soluble such that a homogeneous reaction mixture is achieved. If sufficiently volatile, the diluent may be removed at least in part at the conclusion of the polymerization. This may be accomplished by distillation. In one preferred embodiment this may be accomplished by vacuum distillation with or without steam. Typically the polymeric diluent is not removed.

Examples of suitable polymeric diluents include amine or amide-formaldehyde condensates, saturated polyester polyols, polylactone polyols, acrylic polyols and polyether polyols.

Amine or amide-formaldehyde condensates are described in detail below in the section dealing with aminoplast crosslinking agents. The group of materials commercially available from American Cyanamid under the trademark designation CYMEL are particularly useful herein.

Saturated polyester polyols are prepared from a polyhydric alcohol and a saturated polycarboxylic acid or anhydride thereof where it exists. Usually the polyhydric alcohol is an aliphatic glycol having from 2 to 10 carbon atoms. Suitable aliphatic glycols include ethylene glycol, propylene glycol, butylene glycol, neopentyl glycol, diethylene glycol, triethylene glycol, dipropylene glycol, tripropylene glycol, 1,5-pentanediol, 1,4-cyclohexane dimethanol, and hexamethylene glycol. Mixtures of these glycols may be used if desired. Usually the saturated polycarboxylic acid is a saturated dicarboxylic acid having from 4 to 20 carbon atoms or anhydrides thereof where they exist. Suitable saturated aliphatic dicarboxylic acids include succinic acid, glutaric acid, adipic acid, pimelic acid, suberic acid, azeleic acid, and sebacic acid. Also useful herein are aromatic dicarboxylic acids including phthalic acid, isophthalic acid, terephthalic acid, tetrahydrophthalic acid, hexahydrophthalic acid and anhydrides thereof where they exist.

Polylactone polyols are prepared from the reaction of a lactone such as epsilon caprolactone and a polyol. For example, the diethylene glycol epsilon-caprolactone based polymers commercially available from Union Carbide as PCP-0200 or PCP-0210 are quite suitable herein.

Useful acrylic polyols include interpolymers of hydroxy-containing vinyl monomers such as hydroxyalkyl acrylate and methacrylate having 2 to 6 carbon atoms in the alkyl group and other ethylenically unsaturated copolymerizable materials such as alkyl acrylates and methacrylates.

Examples of suitable hydroxyalkyl acrylates and methacrylates are acrylic acid and methacrylic acid esters of ethylene glycol and propylene glycol. Also useful are hydroxy-containing esters and/or amides of unsaturated acids such as maleic acid, fumaric acid, itaconic acid and the like.

Examples of suitable alkyl acrylates and methacrylates are lauryl methacrylate, 2-ethylhexyl methacrylate and n-butyl acrylate.

Besides the acrylates and methacrylates, other copolymerizable monomers which can be copolymerized with the hydroxyalkyl acrylates and methacrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate and mixtures thereof. Usually these other ethylenically unsaturated materials are used in admixture with the above-mentioned acrylates and methacrylates.

Examples of polyether polyols are polyalkylene ether polyols which include those having the following structural formula:

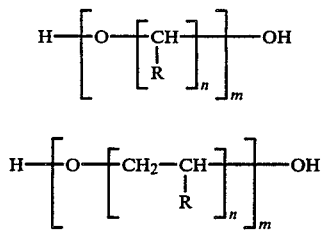

where the substituent R is hydrogen or lower alkyl containing from 1 to 5 carbon atoms including mixed substituents, and n is typically from 2 to 6 and m is from 2 to 100 or even higher. Included are poly(oxytetramethylene) glycols, poly(oxyethylene) glycols, poly(oxy-1,2-propylene) glycols and the reaction products of ethylene glycol with a mixture of 1,2-propylene oxide, ethylene oxide and alkyl glycidyl ethers.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide, in the presence of an acidic or basic catalyst.

It should be understood that the polymeric diluent can be of the same composition as the polymer being formed by the vinyl addition polymerization.

In a preferred embodiment of the present invention a polyester diol is utilized having a hydroxyl number within the range of 80 to 600. It should be understood that the polymeric diluent typically contains a minor amount of unreacted monomeric species. This amount is generally less than 20 percent.

The vinyl addition polymerization is preferably carried out under dilute reaction conditions. By dilute is meant that the amount of unreacted vinyl monomer, on the average does not exceed 10 percent by weight of the total weight of the reaction mixture. Preferably the amount of unreacted vinyl monomer does not exceed 8 percent by weight of the total weight of the reaction mixture. By reaction mixture is meant everything contained in the reactor vessel, i.e., vinyl monomer component, diluent, and initiator. The concentration of vinyl monomer component is controlled so as not to exceed 10 percent by controlling the reaction rate such that monomer which is either present in the mixture or being added to the mixture is being consumed. It is believed that the rapid rate of polymerization and dilute concentration of monomer enhance the probability of chain transfer and chain termination reactions which limit the molecular weight of the polymer which is formed. One way to achieve these conditions is to keep the monomer concentration low by utilizing a slow rate of monomer addition; generally addition can range from 3 hours to 30 hours, although more typically addition is carried out over a period ranging from 7 hours to 12 hours. Under these conditions the amount of free radical initiator typically ranges from about 5 percent to about 25 percent by weight and the reaction temperature is generally within the range of 100° C. to 200° C., preferably 140° C. to 170° C. In addition to the particular choice of initiator the choice of reaction temperature is largely dependent upon the particular choice of diluent. For diluents which contain active hydrogen functionality in the form of hydroxyl groups, it is believed that lower reaction temperatures are helpful in minimizing side reactions which may occur, for example transesterification. For diluents which do not contain hydroxyl functionality, it is believed that higher reaction temperatures are helpful in promoting formation of low molecular weight product by enhancing the probability of chain transfer and chain termination reactions as has been described above.

Alternatively, with more rapid rates of addition the vinyl monomer concentration can be kept low by increasing the initiator level and reaction temperature. Therefore, if the rate of addition of vinyl monomer component is increased, one can still achieve a low molecular weight polymer by increasing either or both the reaction temperature and initiator level. For example, if the vinyl monomer is added over 7 to 12 hours, a reaction temperature of from 140° C. to 170° C. and from 10 percent to 15 percent of initiator can be quite effective. Useful initiators include ditertiaryalkyl peroxides, 2,2-azobis(2-methylbutanenitrile); 1,1'-azobis(cyclohexane carbonitrile); tertiaryalkyl hydroperoxides; and cumene hydroperoxide. Preferably ditertiarybutyl peroxide is utilized in this type of embodiment.

The vinyl addition polymerization of the present invention is typically conducted batchwise with incremental addition of reactants or continuous addition of reactants. In one embodiment of the batch process it is preferred to precharge a portion of the vinyl monomer component and initiator. This has been found to be helpful in reducing the formation of insoluble polymeric particles which are difficult to remove from the reactor at the conclusion of the polymerization. The vinyl addition polymerization of the present invention is particularly advantageous in that low molecular weight products can be formed without the necessity of conventional chain transfer agents, such as tertiary-dodecyl mercaptan, which typically result in performance deficiencies in the films prepared from polymers polymerized using them, such as yellowing and reduced durability. Moreover, the polymerization in the presence of polymeric diluent is also particularly advantageous because since it allows for polymerization essentially in the absence of a volatile component very high solids content compositions can be prepared.

The vinyl addition polymerization reaction can be monitored by periodic determination of the concentration of free vinyl monomer component in the reaction mixture by gas chromatography, high pressure liquid chromatography, or proton nuclear magnetic resonance spectroscopy. Typically, gas chromatography is utilized in conjunction with solids determinations. As was stated above, the concentration of unreacted vinyl monomer, on the average, should always be less than 10 percent by weight of the total weight of the reaction mixture. When the monomer addition is complete, heating is continued with or without the addition of further initiator until there is essentially complete conversion of monomer to polymer. As was mentioned above, the diluent can be removed at least in part, if desired, at the conclusion of the reaction.

The polymeric reaction product of the present invention is preferably essentially free of polymeric species that do not contain active hydrogen functionality. The reaction product generally has a number average molecular weight within the range of 400 to 2,000, preferably up to 1,500, more preferably up to 1,000 and a polydispersity of typically from 1.5 to 3.0. The number average molecular weight is determined by gel permeation chromatography (GPC) as detailed below. It should be understood that when a polymeric diluent is utilized, the molecular weight which is determined by the method described below reflects a contribution from the vinyl addition polymer formed during the polymerization and a contribution from the polymeric diluent. In order to arrive at a number average molecular weight which is indicative solely of the contribution of the vinyl addition polymer, the contribution of the polymeric diluent must be mathematically removed. The manner in which this is accomplished is art-recognized; therefore, a detailed discussion is felt not to be necessary for the purposes of this application. For a detailed treatment of methodology see W. W. Yau, J. J. Kirkland, D. D. Bly, *Modern Size Exclusion Liquid Chromatography; Practice of Gel Permeation and Gel Filtration Chromatography*, John Wiley and Sons, (1979). A number of computer programs are available for this purpose such as the 4400 Series Nelson Data System RATDIFF Program.

Molecular weight is determined by gel permeation chromatography (GPC) using a differential refractometer as the detector. The instrument is first calibrated using a polystyrene standard. Polystyrene standards used were purchased from Pressure Chemicals Company, Pittsburgh, Pennsylvania. The polystyrene standards have dispersities (dispersity = weight average molecular weight/number average molecular weight) ranging from 0.05 to 1.10. The viscosity average molecular weights of the polystyrene standards used were 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.5 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard used was 4,000, and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Millapore Corporation, a 0.5 ml sample size was injected into the columns and a GPC chromatogram obtained under the same experimental conditions as the calibration. From the resulting calibration curve of molecular weight versus retention time, a molecular weight relative to the standard can be assigned to the retention times of the sample. The height (H) of the curve at the corresponding retention times is recorded by the computer. From these height-molecular weight (M) combinations, the following averages are calculated:

$$\text{Number average molecular weight} = \frac{\Sigma H}{\Sigma H/M}.$$

This is the number reported.

The low molecular weight polymeric reaction products of the present invention are useful as film-forming binders in the preparation of coating compositions. The resultant coating compositions have low volatile organic content, generally from 2.5 to 4.0 pounds/gallon and the cured films exhibit good hardness. The active hydrogen-functional polymeric reaction products are usually utilized in conjunction with curing agents which are capable of reacting with the active hydrogens on the polymeric product. Examples of suitable curing agents are aminoplast and isocyanate curing agents, including blocked polyisocyanates. If desired, other film-forming polymers can be blended with the polymeric reaction products of the present invention.

Aminoplast condensates are obtained from the reaction of formaldehyde with an amine or an amide. The most common amines or amides are melamine, urea or benzoguanamine, and are preferred. However, condensates with other amines and amides can be employed, for example, aldehyde condensates or diazines, triazoles, guanidines, guanamines and alkyl and aryl di-substituted derivatives of such compounds including alkyl and aryl-substituted ureas and alkyl and aryl-substituted melamines and benzoguanamines. Some examples of such compounds are N,N-dimethylurea, ethylene diurea, N-phenylurea, dicyandiamide, formoguanamine, acetoguanamine, 6-methyl-2,4-diamino-1,3,5-triazine, 3,5-diaminotriazole, triaminopyrimidine, 2,6-triethyltriamine-1,3,5-triazine and the like.

While the aldehyde employed is most often formaldehyde, other aldehydes such as acetaldehyde, crotonaldehyde, benzaldehyde and furfural may be used.

The aminoplast contains methylol or similar alkylol groups are preferably at least a portion up to essentially all of these alkylol groups are etherified by reaction with an alcohol to help provide organic solvent-soluble resins. Any monohydric alcohol can be employed for this purpose including such alcohols as methanol, ethanol, butanol and hexanol.

Preferably, the aminoplasts which are used are melamine, urea- or benzoguanamine-formaldehyde condensates etherified with an alcohol containing 1 to 4 carbon atoms such as methanol, ethanol, butanol or mixtures thereof.

Polyisocyanates and blocked polyisocyanates may also be used as curing agents. Examples of suitable polyisocyanates include monomeric polyisocyanates such as toluene diisocyanate and 4,4'-methylene-bis-(cyclohexyl isocyanate), isophorone diisocyanate and NCO-prepolymers such as the reaction products of monomeric polyisocyanate such as those mentioned above with polyester of polyether polyols. Particularly useful isocyanates are the isocyanurate from isophorone isocyanate commercially available from Chemische-Werke Huls AG as T1890 and the biuret from 1,6-hexamethylene diisocyanate commercially available from Bayer as DESMODUR N. The polyisocyanate may optionally be blocked. Examples of suitable blocking agents are those materials which would unblock at elevated temperatures such as low aliphatic alcohols such as methanol, oximes such as methyl ethyl ketone oxime, and lactams such as caprolactam. Blocked isocyanates can be used to form stable one-package systems. Polyfunctional isocyanates with free isocyanate groups can be used to form two-package room temperature curable systems. In these systems, the polyester and isocyanate curing agent are mixed just prior to their application.

The following examples are illustrative of the invention and are not meant to limit it to their details.

EXAMPLE I

Preparation of a polyacrylate in the presence of an amino resin

| Charge | Ingredients | Parts by Weight (grams) |
|---|---|---|
| I | CYMEL 300[1] | 1000 |
| II | hydroxypropyl acrylate | 500 |
| | butyl methacrylate | 485 |
| | butyl acrylate | 5 |
| | styrene | 5 |
| | methyl methacrylate | 5 |
| | methyl amyl ketone | 394 |
| | xylene | 35 |
| | dicumyl peroxide | 100 |

[1]This amino resin is a melamine-formaldehyde condensate commercially available from American Cyanamid.

A suitable reactor vessel equipped with thermometer, addition funnels and nitrogen inlet tube was charged with (I) and heated to 150° C. Charge (II) was then added over a period of 6 hours and the reaction mixture was then cooled. The resultant reaction product had a number average molecular weight of 2073 and a polydispersity of 5.86. These values reflect a contribution from the polyacrylate as well as the polymeric diluent.

EXAMPLE II

Preparation of poly(2-hydroxyethyl methacrylate/2-ethylhexyl methacrylate) copolymer in the presence of polyester polyol.

| Charge | Ingredients | Parts by Weight (grams) |
|---|---|---|
| I | polyester polyol[2] | 900 |
| | methyl amyl ketone | 20 |
| II | 2-hydroxyethyl methacrylate | 450 |
| | 2-ethylhexyl methacrylate | 450 |
| | ditertiarybutyl peroxide | 90 |

[2]This polyester polyol was prepared from 2 moles neopentyl glycol and 1 mole hexahydrophthalic anhydride. It had a hydroxyl number of 271.

A suitable reactor vessel equipped with thermometer and addition funnels was charged with (I) and heated to a temperature of 180° C. Charge (II) was then added over a period of 14 hours while maintaining the temperature at 180° C. The reaction mixture was held at this temperature for about 30 minutes and then cooled. The resultant reaction product had a number average molecular weight of 658 and a polydispersity of 1.73. These values reflect a contribution from the polyacrylates as well as the polymeric diluent.

EXAMPLE III

Preparation of poly(2-hydroxyethyl methacrylate/2-ethylhexyl methacrylate) copolymer in the presence of a polyester polyol different from that of Example II.

| Charge | Ingredients | Parts by Weight (grams) |
|---|---|---|
| I | polyester polyol[3] | 900 |
| | methyl amyl ketone | 40 |
| II | 2-hydroxyethyl methacrylate | 629 |
| | 2-ethylhexyl methacrylate | 629 |
| | VAZO 67[4] | 126 |
| | ditertiarybutyl peroxide | 63 |

[3]This polyester polyol was prepared from 3 moles of trimethylpentanediol and 1 mole of hexahydrophthalic anhydride followed by removing a portion of unreacted trimethylpentanediol. It had a hydroxyl value of 186.
[4]This free radical initiator is commercially available from E. I. Dupont de Nemours Company.

A suitable reactor vessel equipped with thermometer, addition funnels and nitrogen inlet tube was charged with (I) and heated to a temperature of 150° C. Charge (B) was then added over a period of 10 hours at a rate of 15 drops per 10 seconds. The reaction mixture was then cooled. Subsequently the reaction mixture was vacuum stripped at 4 millimeters of mercury for 2 hours. The reaction product had a number average molecular weight of 671 and a polydispersity of 2.36. These values reflect a contribution from the polyacrylate as well as the polymeric diluent.

In Examples IV and V, below, the low molecular weight polymeric reaction product of Examples II and III were formulated into clear coating compositions and evaluated as set out below.

| Ingredients | Example IV | Example V |
|---|---|---|
| | (percent by weight) | |
| polymeric reaction product of Example II | 50 | |
| polymeric reaction product of Example III | | 50 |
| CYMEL 1130[5] | 50 | 50 |
| Acid catalyst[6] | 0.75 | 0.75 |

[5] This butylated, methylated melamine-formaldehyde crosslinking agent is commercially available from American Cyanamid.
[6] Dinonylnaphthalene disulfonic acid which is 50 percent neutralized with diisopropanol amine.

The clear coating compositions were prepared by blending the aforesaid components and then reducing to a number 4 Ford cup viscosity of 22 seconds by the addition of methyl amyl ketone. The coating compositions were drawn down over bare steel panels with a 3 mil draw bar and baked for 30 minutes at 250° F. (121° C.). Each cured film had a Tukon hardness of 2.7 and 5.7, respectively for Example IV and V. Tukon hardness is determined by the microscopic examination of the size of an indentation made by a diamond indentor using a 20X objective lens and a 25-gram load. A Filar units scale ranging from 300 to 479 is used to convert from Filar units to Knoop hardness referred to here as Tukon hardness.

EXAMPLE VI

This Example is similar to Example IV. In this Example the number average molecular weight of the polymeric reaction product was mathematically corrected to remove the contribution of the polymeric diluent.

| Charge | Ingredients | Parts by Weight (grams) |
|---|---|---|
| I | polyester polyol[7] | 850 |
| | methyl amyl ketone | 94 |
| II | 2-hydroxyethyl methacrylate | 444 |
| | 2-ethylhexyl methacrylate | 444 |
| | methyl amyl ketone | 47 |
| | ditertiarybutyl peroxide | 204 |
| III | 2-hydroxyethyl methacrylate | 444 |
| | 2-ethylhexyl methacrylate | 444 |
| | methyl amyl ketone | 47 |
| | ditertiarybutyl peroxide | 204 |

[7] This polyester polyol was described in footnote (3), above.

A reactor vessel equipped with thermometer, condenser, nitrogen inlet tube and addition funnel was charged with (I) and brought to a temperature of 150° C. The reaction mixture was held at this temperature for one hour and subsequently charge (II) was added over an eight-hour period. The reaction mixture was held again for one hour at 150° C. and then charge (III) was added. After addition, the reaction mixture was held at 150° C. for one hour and then cooled. The polymeric reaction product had a number average molecular weight of 836 and a polydispersity of 2.57. These values reflect a contribution from the polymeric diluent and the acrylic polymer formed. After correction for the polymeric diluent, the number average molecular weight of the acrylic polymer formed was 1038.

What is claimed is:

1. A process for preparing a polymeric reaction product which comprises the vinyl addition polymerization of a vinyl monomer component of which at least 50 percent by weight is an active hydrogen-containing vinyl monomer, in the presence of a polymeric diluent, the rate of polvmerization being controlled such that the amount of unreacted vinyl monomer, on the average, does not exceed 10 percent by weight, based on the total weight of the reaction mixture.

2. The process of claim 1 wherein the vinyl addition polymerization is conducted at a temperature within the range of from about 100° C. to 200° C. and in the presence of from about 5 percent by weight to 25 percent by weight of a free radical initiator.

3. The process of claim 1 wherein the active hydrogen-containing monomer is hydroxypropyl methacrylate.

4. The process of claim 1 wherein the active hydrogen-containing monomer is 2-hydroxyethyl methacrylate.

5. The process of claim 1 wherein the rate of polymerization is controlled such that the amount of unreacted vinyl monomer, on the average, does not exceed 8 percent by weight of the total weight of the reaction mixture.

6. The process of claim 1 wherein the polymeric diluent is a polyester diol having a hydroxyl number within the range of 80 to 600.

7. The process of claim 1 wherein the polymeric diluent is an amino resin.

8. The process of claim 7 wherein the polymeric diluent is a melamine-formaldehyde condensate.

* * * * *